Aug. 28, 1951 — H. A. WESTBY — 2,566,008
PRESSURE COOKER SAFETY DEVICE
Filed April 27, 1949 — 2 Sheets-Sheet 1

INVENTOR
HENRY ARNOLD WESTBY
BY William C. Babcock
ATTORNEY

Aug. 28, 1951
H. A. WESTBY
2,566,008
PRESSURE COOKER SAFETY DEVICE
Filed April 27, 1949
2 Sheets-Sheet 2
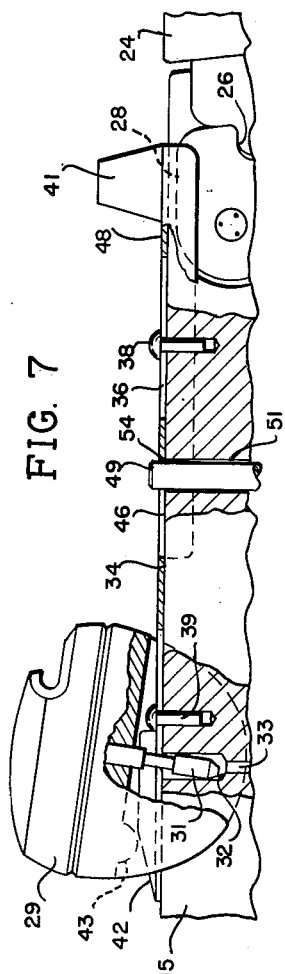
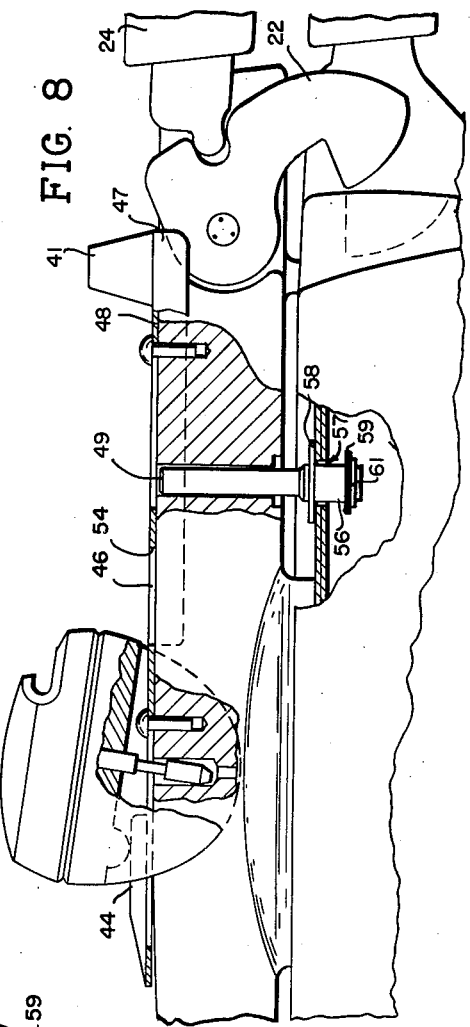
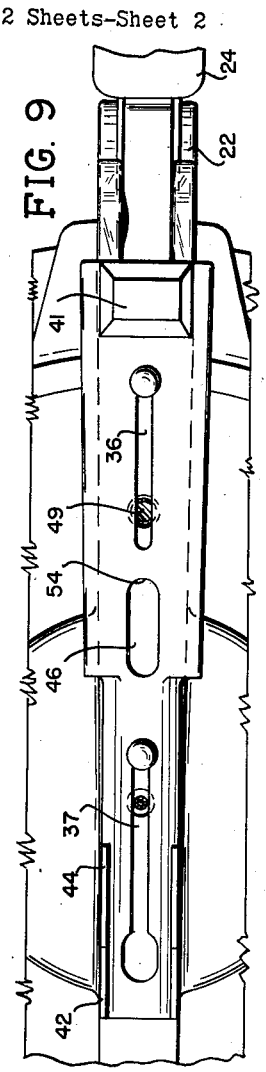
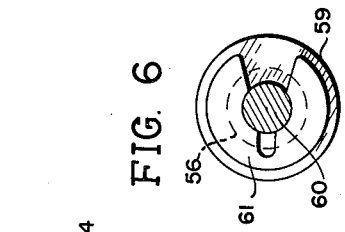
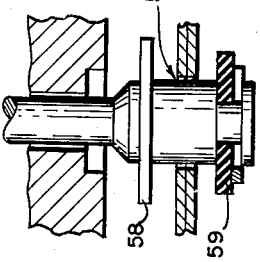
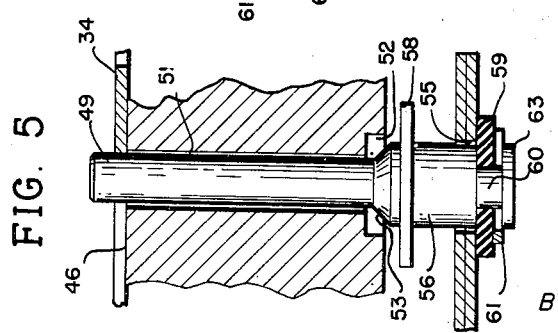
*INVENTOR*
HENRY ARNOLD WESTBY
BY *William C. Babcock*
*ATTORNEY*

Patented Aug. 28, 1951

2,566,008

UNITED STATES PATENT OFFICE 2,566,008

PRESSURE COOKER SAFETY DEVICE

Henry Arnold Westby, Minneapolis, Minn., assignor to General Mills, Inc., a corporation of Delaware Application April 27, 1949, Serial No. 89,919

16 Claims. (Cl. 220—44)

The present invention relates to pressure cookers, and more particularly to an improved safety locking device for such cookers.

Various constructions have been proposed in the past to prevent inadvertent opening of a pressure cooker while excessive pressures remained in the interior of the cooker. One such prior construction is described and claimed in the copending application of Maurice H. Graham and Clement Wood Clemons for Pressure Cooker Locking Device, Serial No. 13,698, filed March 8, 1948, and assigned to the same assignee as the present invention. The locking device of that application included a single operating member which was movable between two positions. In one position of the operating member, a pressure relief member was moved to closed cooking position, and the operating member locked the relatively movable retaining means on the cover and body against cover opening movement. In the second position of the operating member, the relief valve was opened, and the cover retaining means was unlocked for relative movement to open position.

One object of the present invention is to provide an improved pressure cooker locking device of the type shown in the above application.

Another object of the invention is the provision of a pressure cooker in which opening and closing of a control valve, and locking and unlocking of relatively movable cover retaining means may be controlled by a single operating member of improved construction.

A further object of the invention is the provision of a single operating member of the type described, in combination with an additional safety member movable to a position in which it cooperates with the operating member to prevent movement of the latter to unlocking position until it is safe to open the cooker.

Still another object of the invention is to provide a single operating member for the pressure relief valve and the cover locking mechanism in combination with a safety member which is movable in response to a predetermined cooking condition within the body of the cooker.

Another object is the provision of a single operating member of the type described, in combination with a pressure responsive safety member which permits limited movement of the operating member to open the relief valve but prevents complete movement of the operating member to unlocked position until predetermined excessive pressures have been released through the valve.

Other objects and advantages of the invention will be apparent from the following specification in which a preferred embodiment is described by way of illustration.

In the drawings which accompany this specification,

Fig. 4 is a partial sectional view similar to Fig. 3, showing the safety member during its movement toward a safety position.

Fig. 5 is a similar view showing the safety member moved all the way to its safety and sealing position.

Fig. 6 is a sectional view on the line 6—6 of Fig. 5.

Fig. 7 is a view similar to Fig. 1 but with the safety member in safety position and the operating member in its second position.

Fig. 8 is a partial view similar to Figs. 1 and 7, but with the safety member in retracted position and the operating member in unlocked position, and Fig. 9 is a partial top plan of the device of Fig. 8.

Figures 1, 2, 3:
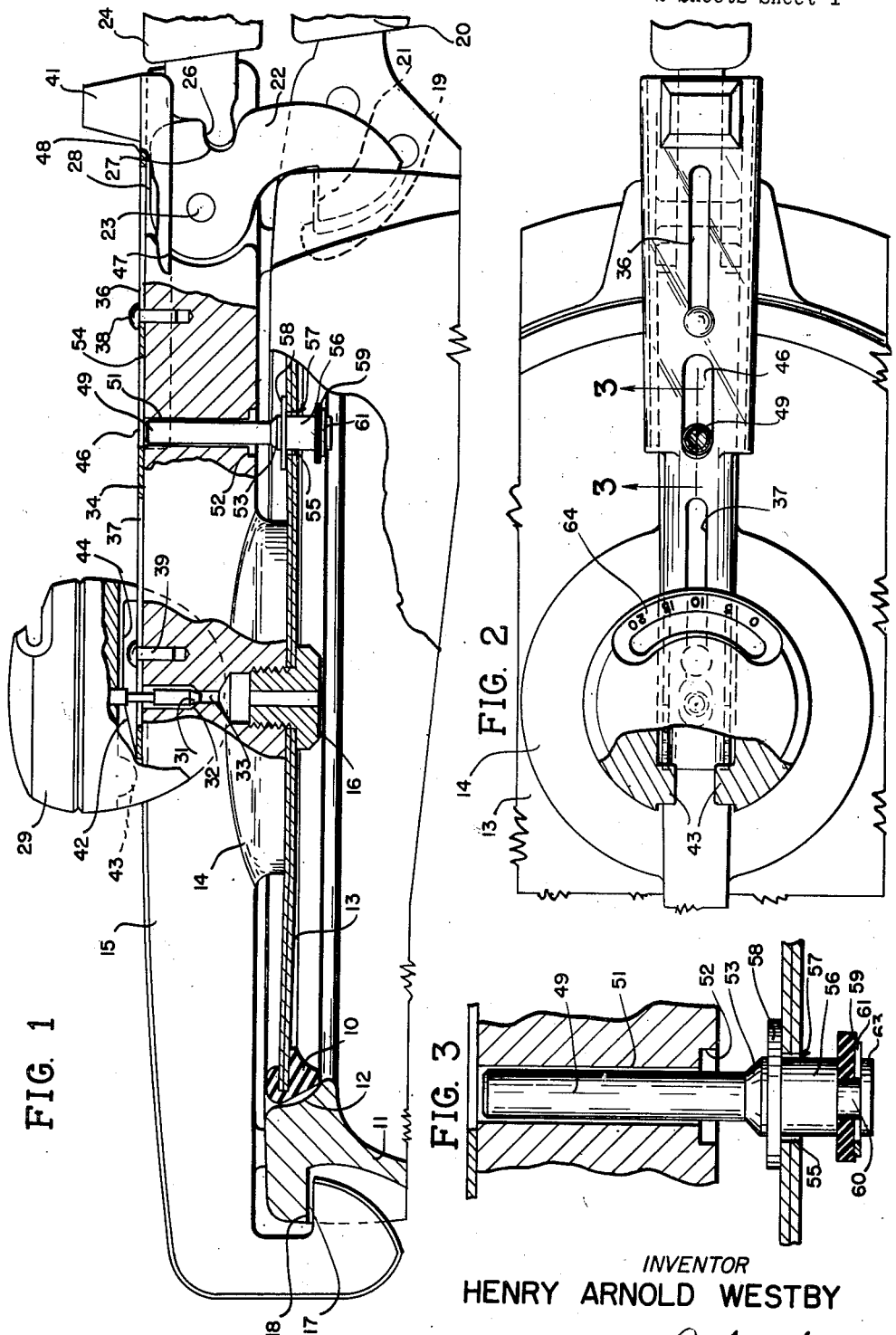
Figure 1 is a partial elevation of a pressure cooker incorporating a safety device according to the present invention, certain portions of the figure being cut away and certain portions being shown in section for the sake of clarity.
Fig. 2 is a partial top plan of the device of Fig. 1.
Fig. 3 is an enlarged partial sectional view taken substantially on the line 3—3 of Fig. 2, showing details of the safety member in its inactive position.

As shown in Fig. 1, the pressure cooker embodying features of the present invention includes a body or pot 11 of any desired construction. The pot includes a top opening or seat 12. A cover 13 having a sealing gasket 10 cooperates with the opening 12 to close the same.

Cover 13 is secured to a circular hub 14 on a transverse cover supporting crossbar 15, by means of a suitable bolt 16. Thus the cover 13 and crossbar 15 may be mounted on the cooker and removed therefrom as a unit.

At one end of the crossbar 15 a hook 17 is provided for cooperation with a locking recess 18 at one side of the cooker body 11. The cooker body is further provided with an additional locking recess 19 at a point substantially diametrically opposite the recess 18. In the construction shown by way of illustration two such locking recesses 19 are provided, one on each side of and immediately adjacent a handle 20.

A latch member 22 (one of which is mounted at each side of handle 20) carries a hook 21 for cooperation with the locking recess 19. Latch member 22 is pivotally mounted at 23 to the end of the crossbar 15 opposite the fixed hook 17. Thus the latch hook 21 and locking recess 19 constitute relatively movable retaining means for holding the cover 13 on the cooker body 11. When the latch hook and recess are in the relative position of Fig. 1, the cover is held securely on the cooker body. On the other hand, relative movement of the parts to the position of Figs. 8 and 9 will permit removal of the cover from the cooker.

Relative movement of the retaining means may be obtained by operation of a suitable actuating handle 24 having a projection 26 engaging an actuating notch 27 of latch 22. Since any desired form of actuating handle for the latch may be provided, its details need not be further described.

When latch 22 is in cover retaining position as in Fig. 1, a shoulder 28 on the upper side of the latch is located substantially flush with the top of crossbar 15. This shoulder 28 is designed to project above the top surface of the crossbar when latch 22 is moved to its open position for removal of the cover as shown in Fig. 8.

A pressure control member or relief valve 29 is located at another point on the crossbar and includes a valve portion 31 cooperating with a valve seat 32 which communicates with the interior of the cooker through a passage 33 in the crossbar. The relief valve 29 is shown in this case in the form of a pressure weight which is normally held by gravity in the lower or closed position of Fig. 1 to close the passage 33 and permit the development of cooking pressures within the pot. Member 29 is designed to be raised by internal pressure to an upper or open position with respect to valve seat 32, whenever the pressure within the pot exceeds a given safe operating pressure.

Provision is also made for manual operation of the control member 29 to open position. For this purpose a single operating member 34 is mounted on the top of crossbar 15. In the present case this member is slidably mounted by means of longitudinal guide slots 36 and 37 which cooperate with retaining pins 38 and 39 respectively. A manual operating knob 41 is mounted at one end of operating member or slide 34 and is preferably located at the end of the slide nearest the operating handles 20 and 24 of the cooker.

Operating member 34 is mounted on the cooker for movement between first, second, and third positions, as illustrated in Figs. 1, 7, and 8 respectively. At one end, the operating member 34 has a pair of inclined cam surfaces 42 which cooperate with lifting projections 43 on the control valve 29 to raise the valve from its lower closed position to its upper pressure relief position when the operating member 34 is moved from the first position of Fig. 1 to the second position of Fig. 7. As illustrated, the lifting projections 43 are offset from the center of gravity of the valve in order to tilt the valve on opening, as described and claimed in the copending application of Maurice H. Graham, Serial No. 3,927, filed January 23, 1948, said application being assigned to the assignee of the present invention.

Horizontal extensions 44 of cam surfaces 42 hold the relief member 29 in its upper pressure relief position during continued movement of the operating member of slide 34 from the second position of Fig. 7 to its third position as illustrated in Fig. 8. Thus the pressure control valve is maintained in open position when slide 34 is in both its second and third positions, while the valve is permitted to move to closed position when the operating slide 34 is in its first position as shown in Fig. 1.

Operating member or slide 34 is also provided with a longitudinal locking slot 46 for a purpose described below. Depending flanges 47 at each side of slide 34 provide increased rigidity for the slide and overlap the outer sides of the crossbar 15 and latches 22.

Operating member 34 includes a locking portion 48 at one end. This locking means or portion extends above the latch members 22 and overlaps the shoulder 28 of each latch in both the first and second positions of the operating slide 34 as illustrated in Figs. 1 and 7. Portion 48 of the operating member therefore blocks upward movement of shoulders 28 and prevents relative movement of the cover retaining means to open position. Further movement of operating member 34 to the unlocked position illustrated in Figs. 8 and 9, moves the locking portion 48 out of the path of shoulders 28 so that the latch members 22 may be moved to cover opening position by means of the handle 24.

As described up to this point, the construction and arrangement of the parts is such that the operating member 34 has three positions. In the first or terminal position illustrated in Fig. 1, the cover retaining means is locked against relative movement to open position, while the pressure control member is permitted to remain in closed cooking position. Therefore the desired cooking pressures can build up within the pot 11 without danger of inadvertent operation of the cover retaining means to open position.

Movement of the operating member 34 to the second or intermediate position illustrated in Fig. 7 moves the pressure control member 29 from closed to open position to permit relief of pressures within the cooker. At the same time, in this second position of the control member, the cover retaining means is still locked against relative movement to cover opening position. Thus as long as the slide remains in the second position, inadvertent removal of the cover is prevented and pressures within the cooker are reduced through the open pressure relief valve.

Finally, movement of the operating member from the second position illustrated in Fig. 7 to the third or opposite terminal position illustrated in Figs. 8 and 9, disengages the locking portion 48 and thus unlocks the cover retaining means for relative movement to cover opening position. In this third position of the operating member 34 the pressure control member is preferably maintained in open position by cam extensions 44 to prevent internal pressure from building up again within the cooker before the cover is removed.

Further according to the present invention, an additional safety member is provided to make certain that the operating member 34 is not moved from its first or second position to its third position until the pressure control member 29 has been opened for a sufficient period of time to reduce the pressure within the cooker to a point below the predetermined maximum safe opening pressure. As illustrated, this safety member is in the form of a plunger 49 which is vertically slidable through a passageway 51 in crossbar 15. The lower end of passage 51 is enlarged at 52 to provide a recessed abutment or shoulder in which the enlarged lower end 53 of the safety member 49 is received to limit upward movement of the safety member.

Safety member 49 is movable from a retracted or inoperative position as illustrated in Fig. 1 to a safety position as illustrated in Figs. 5 and 7, in which member 49 projects upwardly through the locking slot 46 of the operating member 34. When the safety member 49 is in the lower or retracted position of Fig. 1, a position to which it is normally urged by gravity, the member is out of engagement with the locking slot 46 so that operating member 34 may be moved at will to any of its three positions. However, when the safety member 49 is raised to the safety position of Fig. 7 so that it projects through the locking slot 46, the operating member 34 can only be moved between its first and second positions. In other words, the length of locking slot 46 corresponds to the movement of the operating member 34 between said first and second positions. Further movement of the slide from the second to the third position thereof, is prevented by engagement of the abutment 54 at one end of slot 46 against the edge of safety member 49. Thus movement of the operating member 34 to its third position, i.e., to the position in which the cover retaining means is unlocked, can not take place as long as the safety member 49 is in the safety position of Figs. 5 and 7.

While the position of safety member 49 could be controlled manually, or in any other manner which would insure delay of the operating member in second position long enough to reduce pressure, in the preferred form of the invention, movement of the safety member 49 to this safety position takes place automatically in response to a predetermined cooking condition within the pot 11. As examples of such a cooking condition either temperature or pressure might be used. In the present case, since the operating member directly controls the pressure by means of valve 29, it is particularly advantageous and efficient to use a pressure responsive member for actuation of the safety member to its safety position. This pressure responsive member is in the form of a plunger 56 which is vertically movable through an opening 55 in cover 13. The diameter of the plunger 56 is somewhat smaller than the diameter of opening 55, in order that a substantial amount of vapor may escape upwardly through the annular passage 57 between the plunger and the wall of the opening to increase the effective lifting action on plunger 56 as pressure first builds up within the cooker.

A shoulder 58 on the top of plunger 56 overlaps the edges of opening 55 and limits downward movement of the plunger. This flange or shoulder 58 also closes the annular passage 57 when the plunger is in its lower position and provides a surface against which the escaping vapors may impinge to initiate upward movement of plunger 56. The upper surface of flange 58 engages the enlarged lower end of plunger 49 and transmits upward movement of plunger 56 to plunger 49.

At the lower end of plunger 56 a sealing gasket 59 is provided. As shown in Fig. 3, gasket 59 fits a recessed portion at the lower end of plunger 56 and is retained thereon by a spring collar 61 (see also Fig. 6). Portion 63 at the lower end of plunger 56 provides a shoulder retaining the spring washer 61 and gasket 59 in position.

As pointed out above, when pressure first begins to build up within the cooker, the air and vapor within the cooker body will tend to escape outwardly through the annular space 57 between the plunger 56 and cover opening 55. Very slight increase in pressure and escape of vapor in this manner is effective to move the plunger 56 upwardly through the position shown in Fig. 4 to the safety position of Fig. 5.

In this latter position gasket 59 engages the lower side of cover 13 and overlaps the edges of opening 55 to seal the opening completely. Further increase of pressure within the cooker will act against the lower end of the plunger and against the gasket to maintain the parts in sealing engagement in this safety position.

Once the safety member 49 has been raised to the position of Figs. 5 and 7, the pressure within the cooker will maintain the elements in safety position until the internal pressure is reduced below the point necessary to sustain the weight of the safety member and related parts. Since the weight of the safety member is relatively small and since the area of the bottom of the pressure responsive plunger is substantial, pressure within the cooker must be reduced essentially to atmospheric pressure, before the safety member will move from its safety position to its lower or retracted position. Therefore it will be impossible for the user of the cooker to move the operating member 34 to unlocked or third position until substantially all excess pressure within the cooker has been relieved.

Plungers 49 and 56 could, of course, be formed as a single integral element. The two-part or separate construction shown in the drawings is preferred, however, since it simplifies the problem of alignment during manufacture and use. Thus, even if the opening 55 in cover 13 is not centered exactly under passage 51 in the crossbar, the upper surface of flange 58 and the lower end of plunger 49 will still engage each other for movement to and from safety position without binding. Such binding would be more probable, even in slight cases of misalignment, if the plunger portions in the crossbar and cover were rigidly connected.

From the foregoing description of the structural features, operation of the cooker will be readily understood. Thus, at the start of a cooking operation, the cover is placed on the cooker and the cover retaining means 22 is moved to the closed position of Fig. 1. Knob 41 is then manipulated to move the operating member 34 to the first terminal or locking position as illustrated in Fig. 1. The cooker is placed on a suitable source of heat, and since the pressure control valve 29 is closed, temperature and pressure within the cooker will increase. As the pressure starts to build up, the plungers 49 and 56 will be moved upwardly from the position of Fig. 1 to the safety position of Fig. 7 to prevent inadvertent unlocking of the cover retaining means. The heat source is adjusted to maintain the internal pressure at the desired cooking level as indicated by a suitable pressure indicating scale 64 on the control member 29.

After the desired cooking pressure has been maintained for the proper length of time, knob 41 will be manipulated to move the operating member 34 from the position of Fig. 1 to the intermediate position of Fig. 7. At the same time, the application of heat to the cooker may be terminated. This movement of the operating member 34 will open the pressure relief valve 29 and reduce the pressure within the cooker. At the same time, the operating member maintains the latch 22 in locked position so that the cooker can not be inadvertently opened while dangerous pressures remain within the cooker.

After the pressure is reduced by means of the open relief valve to substantially atmospheric pressure, the safety member 49 will be permitted to drop to its retracted position, so that the knob 41 may again be manipulated to move the operating member 34 to its third or unlocked position. In this third position of the operating member, the latch 22 will be disengaged so that it can be moved to cover opening position for removal of the cover.

Thus the construction described by way of example provides an improved safety locking device for pressure cookers which can be readily understood and easily operated with absolute safety by the ordinary user.

Since variations and changes in the exact details of construction and location of the parts will be apparent to persons skilled in this field, it is intended that this invention shall cover all such changes and modifications as fall within the spirit and scope of the attached claims.

Now, therefore, I claim:

1. In a pressure cooker having a body, a removable cover, relatively movable retaining means on the cover and body for holding the cover on the body, and a pressure control member movable between a closed cooking position and an open pressure relief position, the improvement comprising an operating member mounted on the cooker for movement between first and third terminal positions through an intermediate second position, means connecting the operating member and pressure control member and moving the latter from closed to open position when the operating member is moved from first to intermediate position, means on the operating member locking the retaining means against relative movement when the operating member is in its first position and also when it is moved to its intermediate position, and unlocking the retaining means for relative cover opening movement when the operating member is moved to its third position, and a safety member mounted on the cooker and movable in response to a predetermined cooking condition to a safety position in which it blocks movement of the operating member from intermediate to third position.

2. A pressure cooker according to claim 1, in which the safety member comprises a pressure responsive plunger.

3. In a pressure cooker having a body, a removable cover, a movable latch for retaining the cover on the body, and a pressure control member movable between a closed cooking position and a pressure relief position, the improvement comprising an operating member for the control member slidably mounted on the cooker for movement between first and third terminal positions through an intermediate second position, a portion of the operating member engaging and moving the control member to pressure relief position when the operating member is moved from first to intermediate position, and another portion of the operating member engaging and locking the latch in cover retaining position throughout movement of the operating member from first to intermediate position and unlocking the latch on movement of the operating member to third position, and a safety member movable in response to a predetermined cooking condition to a safety position in which it blocks movement of the operating member from its intermediate position to its third position.

4. In a pressure cooker having a body, a removable cover, a movable latch for retaining the cover on the body, and a pressure control weight movable between a lower closed cooking position and a raised pressure relief position, the improvement comprising an operating member for the weight slidably mounted on the cooker for movement between first and third terminal positions through an intermediate second position, a portion of the operating member engaging and lifting the weight to pressure relief position when the operating member is moved from first to intermediate position, and another portion of the operating member engaging and locking the latch in cover retaining position throughout movement of the operating member from first to intermediate position and unlocking the latch on movement of the operating member to third position, and a safety member movable in response to a predetermined cooking condition to a safety position in which it blocks movement of the operating member from its intermediate position to its third position.

5. A pressure cooker according to claim 4 in which the operating member includes a locking slot, and the safety member comprises a pressure responsive plunger movable into a safety position projecting through the slot.

6. A pressure cooker according to claim 5 in which the operating member also has a guide slot which overlies the plunger when the operating member is in its third position, the guide slot being narrower than the locking slot and plunger.

7. A pressure cooker having a body provided with an opening, a cover for the opening, a removable crossbar to which the cover is fastened, cover latching means at one end of the crossbar movable between open and closed positions, a pressure control member at another point on the crossbar movable between a closed cooking position and an open pressure relief position, an operating slide mounted on the crossbar for movement between a first terminal position toward the latch end of the crossbar, a third terminal position toward the pressure control member, and an intermediate second position, means on the slide engaging and moving the control member to open position when the slide is moved from first to intermediate position, means on the slide engaging and locking the latching means in closed position throughout movement of the slide between first and intermediate position and unlocking the latching means on movement of the slide to its third position, and a safety member movable in response to a predetermined cooking condition to a safety position in which it blocks movement of the slide from intermediate to third position.

8. A pressure cooker according to claim 7 in which the safety member moves to safety position in response to predetermined pressure within the cooker.

9. A pressure cooker according to claim 7 in which the slide includes a locking abutment and the safety member moves to a safety position in the path of movement of the abutment in response to predetermined pressure within the cooker, the abutment engaging the safety member on movement of the slide from first to intermediate position and preventing further movement of the slide from intermediate to third position until the predetermined pressure is relieved.

10. A pressure cooker according to claim 7 in which the means on the slide engaging and moving the control member to open position also maintains the control member in open position during subsequent movement of the slide from intermediate to third position.

11. In a pressure cooker having a body, a removable cover, relatively movable retaining means on the cover and body for holding the cover on the body, and a pressure relief member movable between open and closed positions, the improvement comprising an operating member mounted on the cooker for movement between first and third terminal positions through an intermediate position, interengaging means on the operating and relief members holding the relief member open in the intermediate and third positions of the operating member and permitting movement of the relief member to closed position in the first position of the operating member, means on the operating member locking the retaining means against relative movement when the operating member is in first position and also when it is moved from first to intermediate position and unlocking the retaining means when the operating slide is moved from intermediate to third position, and a separate safety member on the cooker movable to a safety position in which it blocks movement of the operating member from intermediate to third position.

12. A pressure cooker according to claim 11 in which the safety member comprises an element exposed to pressure within the cooker and movable to safety position in response to pressures which exceed a predetermined maximum safe opening pressure.

13. In a pressure cooker having a body, a removable cover, relatively movable retaining means on the cover and body for holding the cover on the body, and a pressure relief member movable between open and closed positions, the improvement comprising an operating member mounted on the cooker for movement between first, second and third positions, means on the operating member moving the relief member from closed to open position when the operating member is moved from first to second position, means on the operating member locking the retaining means against relative movement when the operating member is in first and second positions and also throughout movement of the operating member between first and second positions and unlocking the retaining means when the operating member is moved to third position, and a separate safety member on the cooker movable to and from a safety position in which it blocks movement of the operating member from its first two positions to its third position.

14. A pressure cooker according to claim 13 in which the safety member comprises an element automatically movable to safety position in response to a predetermined cooking condition within the cooker.

15. A pressure cooker having a body provided with an opening, a cover for the opening, a removable crossbar to which the cover is fastened, a pivoted latch at one point on the crossbar movable between open and closed positions, the latch having a shoulder which is substantially flush with the top of the crossbar when the latch is closed and which projects above the crossbar top when the latch is opened, a pressure control member at another point on the crossbar movable between a closed cooking position and an open pressure relief position, an operating slide mounted on top of the crossbar for movement lengthwise of the bar between first, second and third positions, one end of the slide overlapping said shoulder and preventing movement of the latch from closed to open position when the slide is in first position and also when it is moved from first to second position, means on the slide engaging and moving the control member from closed to open position when the slide is moved from first to second position, and a separate safety member automtically movable to a safety position in response to predetermined pressure within the cooker, the slide having an abutment engaging the safety member when the latter is in safety position and preventing movement of the slide from first and second position to third position until the predetermined pressure is relieved.

16. A pressure cooker according to claim 15, in which the slide has a longitudinal locking slot above the crossbar and the safety member moves vertically through the crossbar to a safety position in which it projects through the slot, the length of the slot corresponding to the movement of the slide between first and second positions and said abutment defining one end of the slot.

HENRY ARNOLD WESTBY.

REFERENCES CITED

The following references are of record in the file of this patent:

UNITED STATES PATENTS

| Number | Name | Date |
| --- | --- | --- |
| 1,418,530 | Burnham | June 6, 1922 |
| 1,821,726 | Saporta | Sept. 1, 1931 |
| 1,933,740 | Kuwada | Nov. 7, 1933 |

FOREIGN PATENTS

| Number | Country | Date |
| --- | --- | --- |
| 874,691 | France | May 18, 1942 |